US007577214B2

(12) United States Patent
Abe (10) Patent No.: US 7,577,214 B2
(45) Date of Patent: Aug. 18, 2009

(54) OFDM SIGNAL RECEIVER AND RECEIVING METHOD

(75) Inventor: Yoshinori Abe, Tokyo (JP)

(73) Assignee: Pioneer Corporation, Tokyo (JP)

( * ) Notice: Subject to any disclaimer, the term of this patent is extended or adjusted under 35 U.S.C. 154(b) by 728 days.

(21) Appl. No.: 11/280,335

(22) Filed: Nov. 17, 2005

(65) Prior Publication Data

US 2006/0104376 A1 May 18, 2006

(30) Foreign Application Priority Data

Nov. 18, 2004 (JP) .............................. 2004-334003

(51) Int. Cl.
*H04K 1/10* (2006.01)
(52) U.S. Cl. .................... 375/326; 375/324; 375/344
(58) Field of Classification Search ................ 375/316, 375/260, 326, 329, 340, 346, 344, 348; 370/210, 370/208
See application file for complete search history.

(56) References Cited

U.S. PATENT DOCUMENTS

| 5,602,835 | A * | 2/1997 | Seki et al. ............... 370/206 |
| 6,654,429 | B1 * | 11/2003 | Li ........................... 375/316 |
| 6,757,344 | B2 * | 6/2004 | Carleton ................... 375/341 |
| 7,139,320 | B1 * | 11/2006 | Singh et al. .............. 375/260 |
| 2003/0026371 | A1 | 2/2003 | Laroia et al. |
| 2004/0228272 | A1 * | 11/2004 | Hasegawa et al. ........ 370/210 |
| 2005/0175113 | A1 * | 8/2005 | Okuyama ................ 375/260 |
| 2005/0180517 | A1 * | 8/2005 | Abe ........................ 375/260 |
| 2005/0207334 | A1 * | 9/2005 | Hadad ..................... 370/203 |
| 2006/0227887 | A1 * | 10/2006 | Li et al. .................. 375/260 |
| 2008/0069250 | A1 * | 3/2008 | Nee ....................... 375/260 |

FOREIGN PATENT DOCUMENTS

EP 1564946 A2 8/2005
WO 9619056 A1 6/1996

OTHER PUBLICATIONS

Tomohiro Kimura, et al., "A Study of Frequency Synchronization Scheme of OFDM Modulation", Television Society Technical Report, vol. 20, No. 53, pp. 61-66, Oct. 17, 1996.
Xiangming Li, et al. "A Difference Method of the Gravity Center with Double Pilots for the MC-CDMA System", IEEE Asia-Pacific Conference on Circuits and Systems, Dec. 4, 2000, pp. 25-29.

(Continued)

*Primary Examiner*—Chieh M Fan
*Assistant Examiner*—Aristocratis Fotakis
(74) *Attorney, Agent, or Firm*—Sughrue Mion, PLLC (57) ABSTRACT

A receiver having a frequency-deviation detector which includes: a storage for locating and storing the frequency-domain symbol-signal in a two-dimensional data area on a two-dimensional space corresponding to a carrier frequency and a symbol time; a calculator for calculating the transfer characteristic of a pilot signal; a Fourier transformer for performing two-dimensional Fourier transform on the calculated characteristic to locate the data group after the transform in a two-dimensional Fourier transform data area corresponding to a transmission delay time and path fluctuation frequency; and a calculation portion for calculating the frequency deviation based on the center-of-gravity value.

6 Claims, 7 Drawing Sheets

OTHER PUBLICATIONS

Arto Palin, "Symbol. Synchronization of OFDM System for Time Selective Channel Conditions", Proceedings of the 6th IEEE International Conference on Electronics, Circuits and Systems, Sep. 5, 1999 pp. 1581-1584.

Y. Harada et al. "An Implementation of OFDM Receiver for Digital Terrestrial Television Broadcasting and its Technologies" International Broadcasting Convention, Sep. 17, 1997, pp. 337-342.

* cited by examiner

– 1 –
OFDM SIGNAL RECEIVER AND RECEIVING METHOD

BACKGROUND OF THE INVENTION

1. Field of the Invention

The present invention relates to a carrier frequency error detector in a receiver which receives and demodulates broadcasting using an OFDM system, and a detection method thereof.

2. Description of the Related Art

As a modulation system for terrestrial wave digital broadcasting, OFDM (Orthogonal Frequency Division Multiplex) is known, and this system is widely used in terrestrial wave digital broadcasting, including the DVB-T (Digital Video Broadcasting-Terrestrial) standard in Europe and the ISDB-T (Integrated Services Digital Broadcasting-Terrestrial) standard in Japan. OFDM uses many carriers which are set at equal intervals on a frequency axis, that is, it uses a multi-carrier system, and is a modulation system where the OFDM symbols (hereafter referred to as "symbols"), acquired by modulating these carriers based on the transmission data, are sequentially sent at each unit transmission time (hereafter referred to as "symbol transmission period").

In the case of terrestrial wave digital broadcasting using the OFDM system, pilot carrier signals, to make it easier to estimate the transfer characteristics of the transmission path, are used along with the data carrier signals for transmitting information data, such as images and voice. For example, in such a standard as the above mentioned ISDB-T and DVB-T, a pilot carrier signal referred to as a scattered pilot (SP) signal (hereafter referred to as "SP signal") is specified. When an OFDM symbol space comprised of two dimensions of a carrier frequency and symbol time is assumed, it is known that the SP signals are superimposed on a specific position in this space, and the complex amplitude thereof, that is the absolute amplitude and the phase of the SP signal, is also predetermined. Therefore a receiver, which receives digital broadcasting based on these standards, can estimate the transmission characteristics of a radio wave propagation path of each carrier using the SP signal, and can perform correction processing and equalization processing on the receive signals based on this estimation result. Carriers other than the SP signals included in the OFDM symbol space are, needless to say, data carrier signals on which modulation, such as QAM and PSK, has been performed.

When an OFDM signal is observed in a time domain, the symbol is comprised of a guard period and a valid symbol period. The signal included in the valid symbol period is used for decoding the receive data included in the OFDM signal. The guard period is a part created to prevent interference by delay signals due to multi-paths, and normally a part of the signal in the rear part of the valid symbol period is cyclically copied and used.

When the OFDM signal is decoded, the interference between carriers, due to the frequency deviation of carrier waves, is easily generated since the frequency space between each carrier is narrow, so high precision frequency synchronization is required. For the frequency synchronization, the carrier frequency deviation detector and the detection method shown, for example, in Television Society Technical Report, Vol. 20, No. 53, pp. 61-66 (Oct. 17, 1996), "Study of Frequency Synchronization of OFDM Modulation" (Tomohiro Kimura, Kenichiro Hayashi, Sadashi Kageyama, and three others), are used in a conventional OFDM receiver.

The configuration and operation of a conventional carrier frequency deviation detector will be described in brief. As mentioned above, in the case of the OFDM signal, the signal at the rear part of the valid symbol period is copied as the signal in the guard period, so the signal in the guard period and the signal at the rear part of the valid symbol period are essentially the same. However if deviation occurs to the carrier frequency, phase rotation occurs between the signals of these two period. In a conventional system, the correlation vector of the signals of these two periods is determined, and the carrier frequency deviation is estimated from the value of the phase rotation. In this system, the estimated frequency deviation of the carrier is determined by estimating the deviation from the correlation value between the complex base area series signal, which is the output of the front end of the receiver, and the signal acquired by delaying this signal for a valid symbol length and determining the complex conjugate value thereof.

In a conventional system, however, if such a disturbance as multi-path interference occurs, the estimation accuracy of the carrier frequency deviation deteriorates because of the influence of the correlation which is generated on signals in a portion other than the guard period. Therefore the residual frequency deviation in the complex base area serial signal of the entire OFDM receiver increases, and the error rate characteristic of the receive signal deteriorates by ICI (Inter-Carrier Interference), which is generated between carriers.

SUMMARY OF THE INVENTION

It is an object of the present invention to provide a carrier frequency deviation detector and a detection method, which can acquire an accurate carrier frequency deviation even when a disturbance, such as multi-path interference, is large in an OFDM signal receiver.

According to the present invention, there is provided an OFDM signal receiver, including: a front end section for receiving an OFDM signal including a plurality of carriers in which pilot signals, having a predetermined complex amplitude, are superimposed, and generating a complex base area signal by performing frequency conversion processing and sampling processing on the OFDM signal; a symbol extraction section and an FFT processing section for generating a frequency domain symbol signal from the complex base area signal; a receive data decoding section for demodulating the frequency domain symbol signal and generating receive data; a frequency deviation detection section for detecting the frequency deviation of a carrier included in the OFDM signal based on the frequency domain symbol signal; and a conversion frequency control section for adjusting a conversion frequency in the frequency conversion processing of the front end section based on the detected frequency deviation, wherein the frequency deviation detection section includes: a symbol storage portion for locating and storing the frequency domain symbol signal in a two-dimensional data area on a two-dimensional space corresponding to a carrier frequency and a symbol time; a transfer characteristic calculation portion for calculating the transfer characteristic of a pilot signal included in the symbol signal located in the two-dimensional data area; a two-dimensional Fourier transform portion for performing two-dimensional Fourier transform on the calculated transfer characteristic of the pilot signal and locating the data group after the transform in a two-dimensional Fourier transform data area on a two-dimensional space corresponding to a transmission path delay time and a transmission path fluctuation frequency; and a center-of-gravity calculation portion for determining a center-of-gravity value of the data group located in the two-dimensional Fourier transform data area and calculating the frequency deviation of the carrier based on the center-of-gravity value.

According to the present invention, there is provided a method for receiving an OFDM signal, including the steps of: receiving an OFDM signal including a plurality of carriers in which pilot signals, having a predetermined complex amplitude, are superimposed, and generating a complex base area signal by performing frequency conversion processing and sampling processing on the OFDM signal; generating a frequency domain symbol signal from the complex base area signal; demodulating the frequency domain symbol signal and generating receive data; detecting the frequency deviation of a carrier included in the OFDM signal based on the frequency domain symbol signal; and adjusting a conversion frequency in the frequency conversion processing based on the detected frequency deviation, wherein the step of detecting the frequency deviation includes the steps of: locating and storing the frequency domain symbol signal in a two-dimensional data area on a two-dimensional space corresponding to a carrier frequency and symbol time; calculating the transfer characteristic of a pilot signal included in the symbol signal located in the two-dimensional data area; performing two-dimensional Fourier transform on the calculated transfer characteristic of the pilot signal, and locating the data group after the transform in a two-dimensional Fourier transform data area on a two-dimensional space corresponding to a transmission path delay time and transmission path fluctuation frequency; and determining a center-of-gravity value of the data group located in the two-dimensional Fourier transform data area and calculating the frequency deviation of the carrier based on the center-of-gravity value.

DETAILED DESCRIPTION OF THE INVENTION

EMBODIMENT 1

Figure 1:
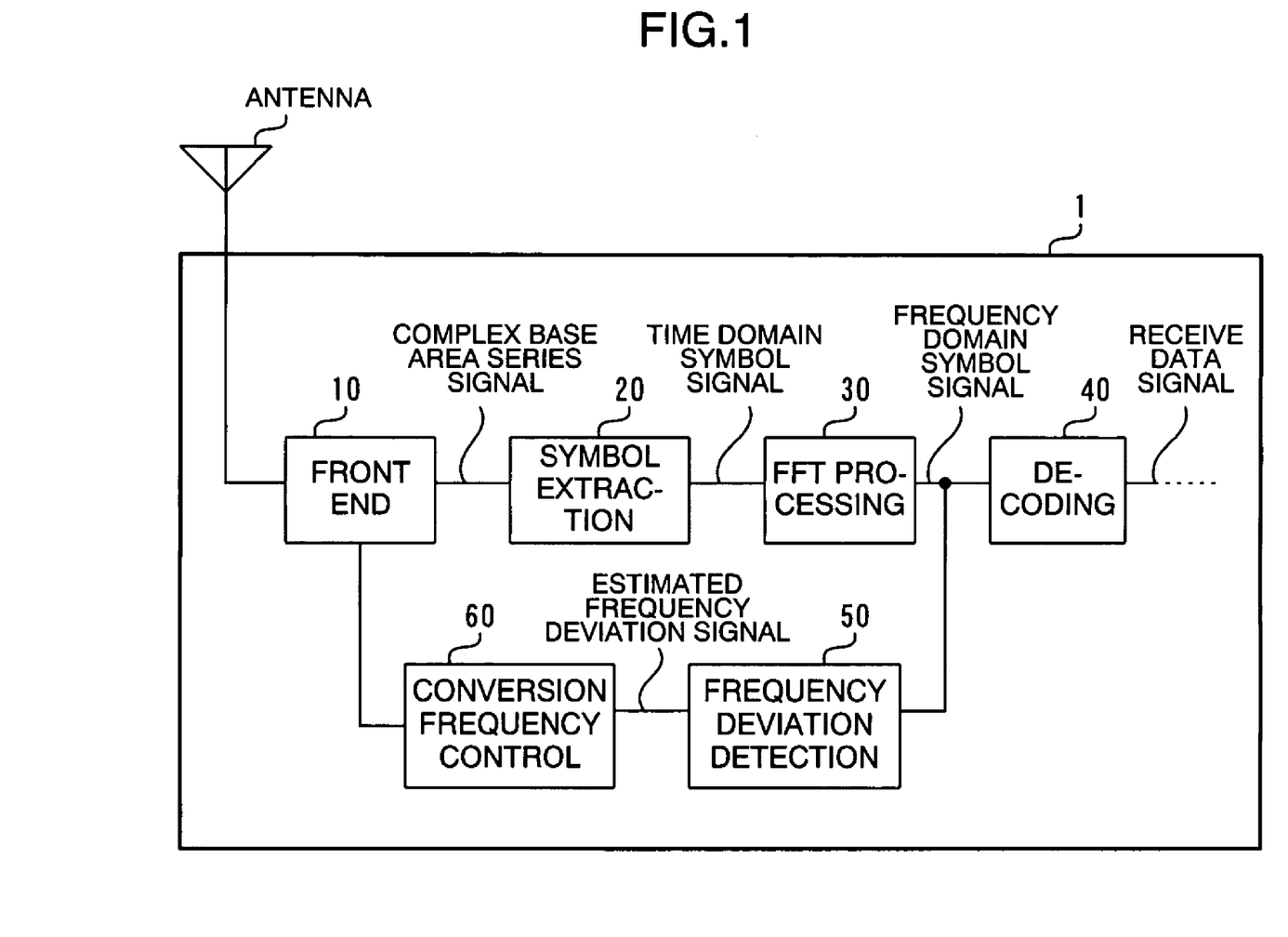
FIG. 1 is a block diagram illustrating the configuration of an OFDM signal receiver according to an embodiment of the present invention.

FIG. 1 shows the OFDM receiver 1 of a first embodiment of the present invention.

In FIG. 1, the RF signal, which is input from the antenna, receives frequency conversion processing by a front end section 10, is sampled by a predetermined sampling frequency, and is converted into a complex base area series signal. A symbol extraction section 20 in the next step removes the signal in the guard period included in the signal, and outputs the time domain symbol signal of the received OFDM signal. An FFT processing section 30 converts the signal into the frequency domain symbol signal by performing discrete Fourier transform on the time domain symbol signal. Then frequency domain symbol signal is supplied to a receive data decoding section 40, and after equalization processing for the transmission path characteristic and the error correction processing by various error correction codes are performed, the receive data included in the received OFDM signal is decoded.

The frequency domain symbol signal, on the other hand, is supplied from the FFT processing section 30 to a frequency deviation detection section 50, and the estimated frequency deviation of the carrier frequency is detected by the detection section, and the estimated frequency deviation signal, which is the result thereof, is supplied to a conversion frequency control section 60. The conversion frequency control section 60 performs feedback control for adjusting the conversion frequency of the down conversion in the front end section 10 so that the estimated frequency deviation signal becomes zero.

Figure 2:
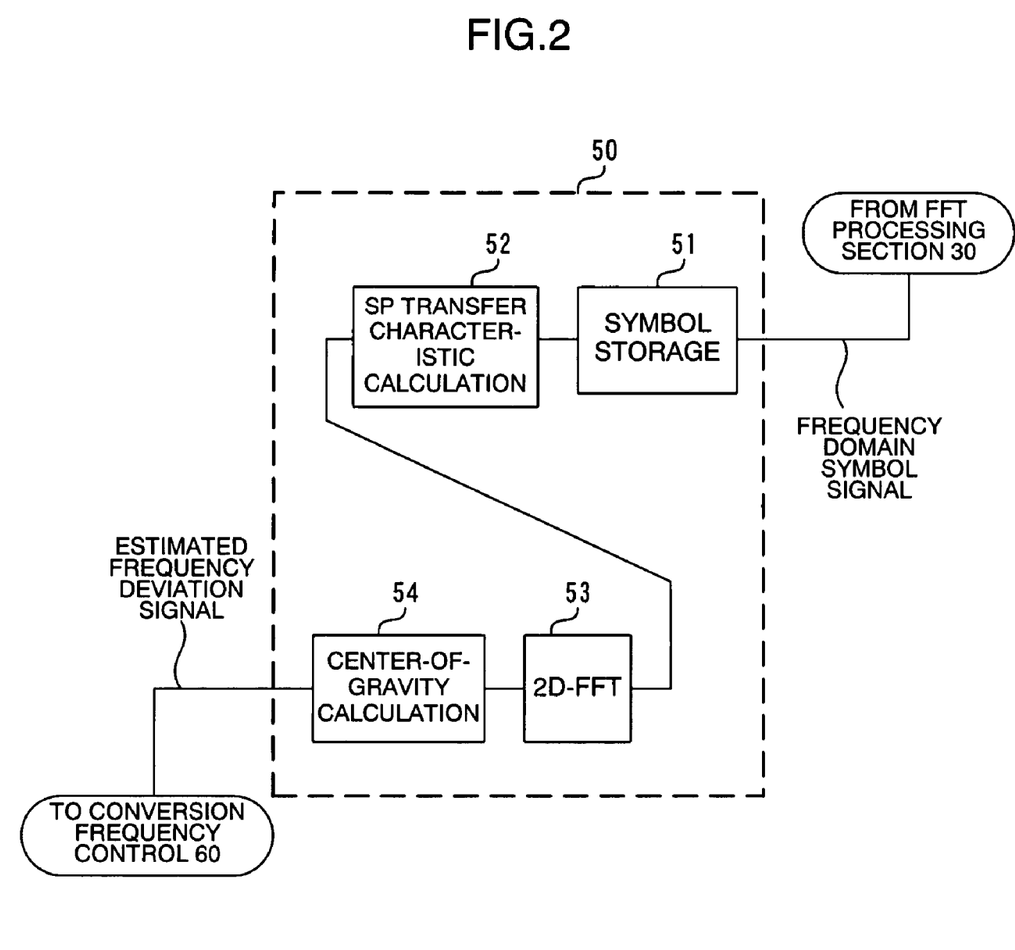
FIG. 2 is a block diagram illustrating the configuration of the frequency deviation detection section in the receiver in FIG. 1.

Now the configuration and the operation of the frequency deviation detection section 50 will be described with reference to the block diagram shown in FIG. 2. As illustrated in FIG. 2, the frequency deviation detection section 50 is comprised of a symbol storage circuit 51, SP (Scattered Plot) signal transfer characteristic calculation circuit 52 (hereafter, simply referred to as "calculation circuit 52"), two-dimensional Fourier transform circuit 53 (hereafter, simply referred to as "transform circuit 53"), and a center-of-gravity calculation circuit 54.

The symbol storage circuit 51 is a circuit for storing the carrier amplitude of a carrier group included in the frequency domain symbol signal supplied from the FFT processing section 30. In other words, if an OFDM symbol space comprised of two dimensions of a carrier frequency and a symbol time is assumed, the symbol storage circuit 51 selects nX symbols at the center area of the carrier frequency channel, and these symbols are stored for nY symbol time in a symbol time direction.

Figure 3:
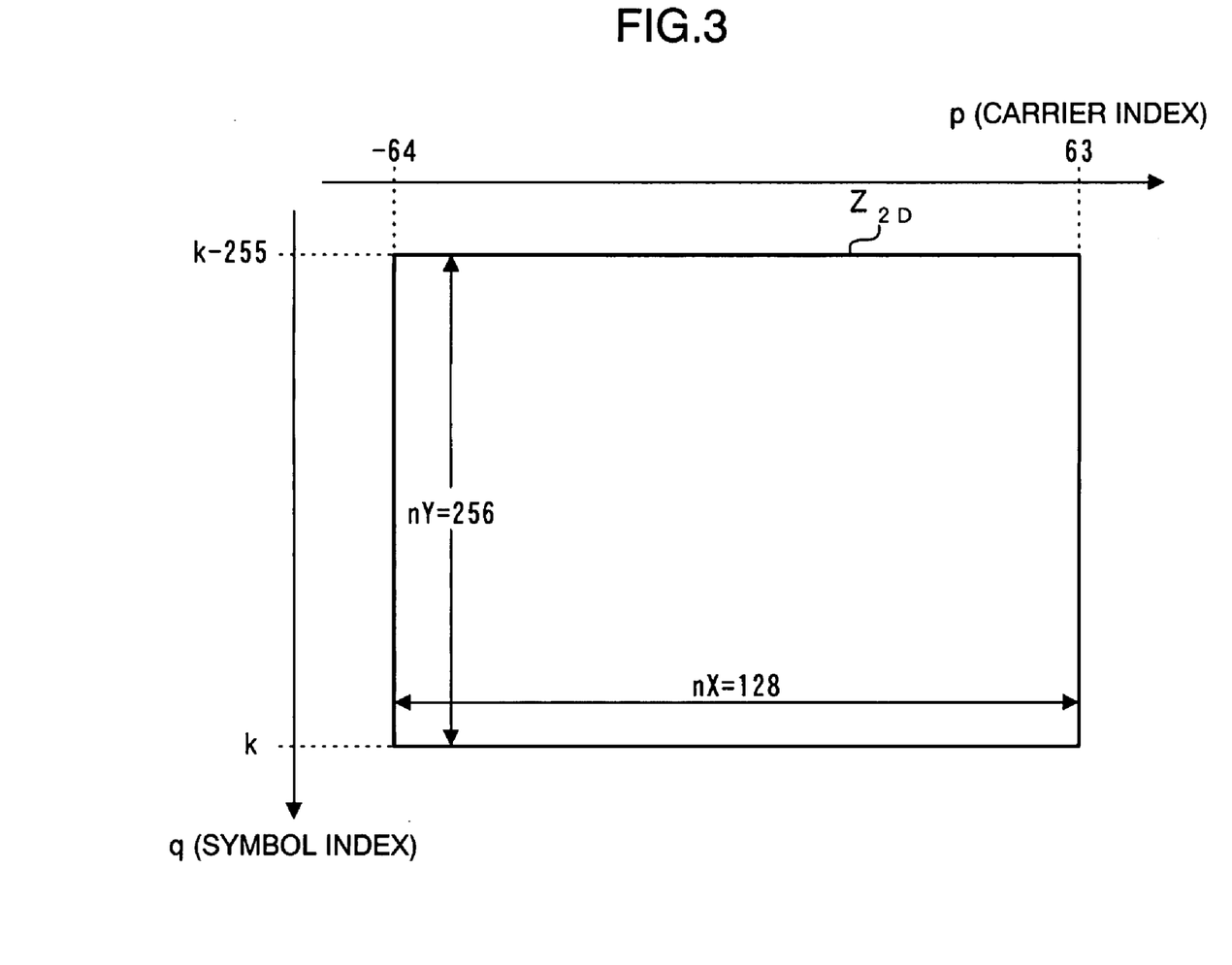
FIG. 3 is a diagram illustrating the configuration of the symbol space of the OFDM signal.

In the present embodiment, it is assumed that the symbol storage circuit 51 stores and holds (nX×nY symbols) of the carrier group in the OFDM symbols space, where carrier amplitude $S_{p,q}$ ($-nX/2 \leq p < nX/2$, $k-nY < q \leq k$), as shown in FIG. 3. In FIG. 3, p indicates a carrier index, and q indicates a symbol index, and the dimensions of each index corresponds to the carrier frequency and the symbol time. The area $Z_{2D}$ corresponds to the two-dimensional fast Fourier transform area (hereafter referred to as "2D-FFT area") of the later mentioned transform circuit 53, and the range of the area is defined as $-nX/2 \leq p < nX/2$ in the carrier frequency axis, and it is defined as $k-nY < q \leq k$ in the symbol time axis.

The specific numeric values of nX and nY shown in FIG. 3 are merely examples used to describe the operation, and the embodiments of the present invention are not of course restricted by these numeric value examples. In the following description, it is assumed that the amplitudes of the stored and held carrier is the two-dimensional array $\{S_{p,q}: (p, q) \in Z_{2D}\}$ on the (p, q) space.

The data stored in the symbol storage circuit 51 is supplied to the calculation circuit 52 in the next step at a predetermined timing.

As described above, in the terrestrial wave digital broadcasting based on the ISDB-T standard, the position of the SP signal in the carrier array in the OFDM symbol space and the complex amplitude value of the SP signal at the transmission are predetermined. Therefore the calculation circuit 52 extracts only the carrier amplitude related to the SP signal out of the carrier amplitudes supplied from the symbol storage circuit 51, and divides this by a predetermined transmission complex amplitude value. By this, the transfer characteristic $\{H_{p,q}: (p, q) \in Z_{2D}\}$ can be determined for the SP signals spotted on the (p, q) space. This calculation procedure is as follows.

Figure 4:
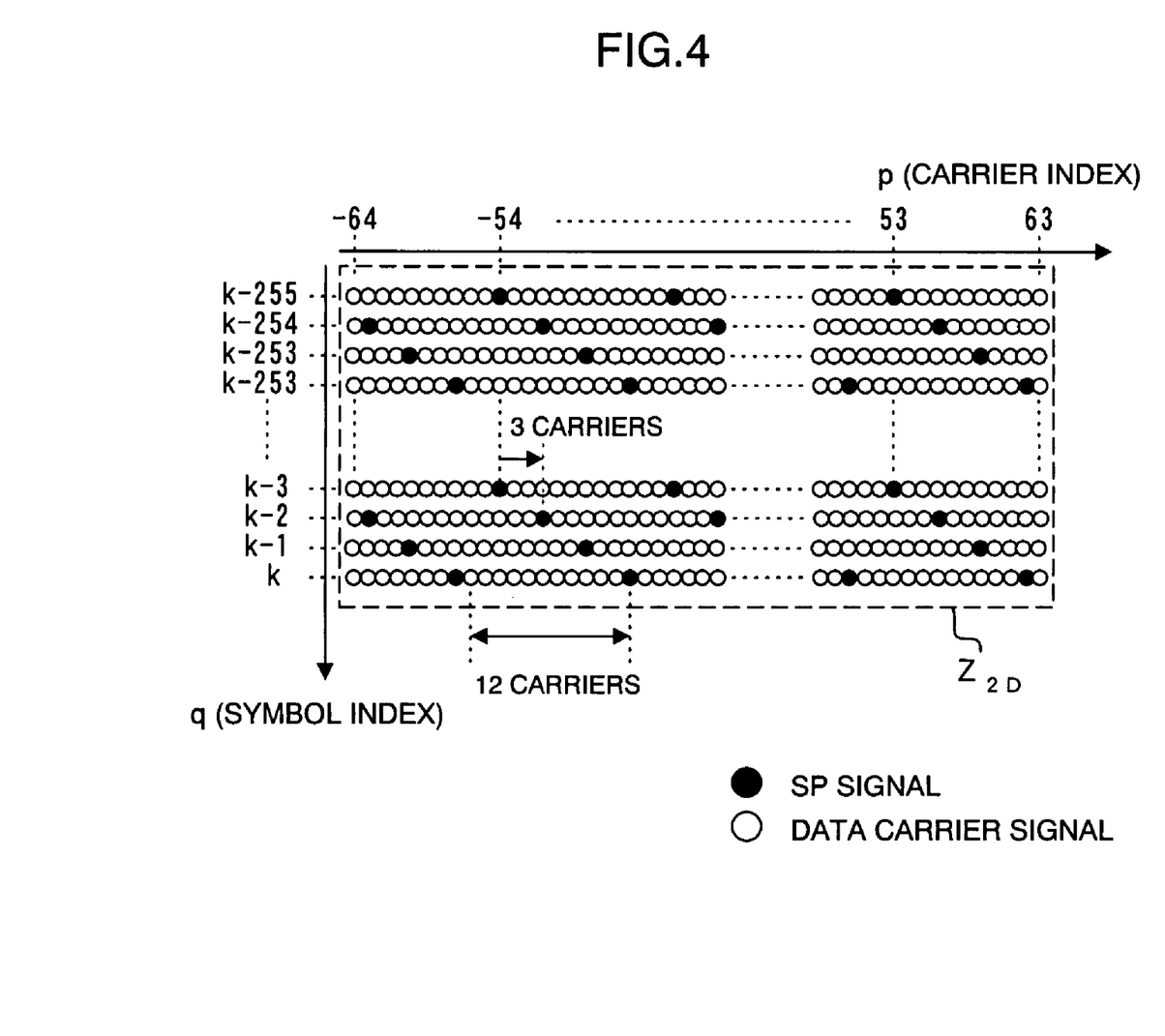
FIG. 4 is a diagram illustrating the attribute of the carriers located in the symbol space of the OFDM signal.

First the calculation circuit 52 determines the transfer characteristic $H_{p,q}$ of this SP signal for all the elements (p, q) in the area $Z_{2D}$ shown by the broken line in FIG. 4 as $H_{p,q}=S_{p,q}/R_{p,q}$ if $S_{p,q}$ corresponds to the SP signal. Here $R_{p,q}$ is a transmission complex amplitude value of the SP signal which is known.

The calculation circuit 52 also determines the transfer function of the data carrier signal, other than the SP signal, as $H_{p,q}=0$.

The calculation circuit 52 determines the transfer characteristic $H_{p,q}$ for all the elements (p, q) in the area $Z_{2D}$, and outputs the result to the conversion circuit 53.

In the conversion circuit 53, two-dimensional Fourier transform is performed for the SP signal transfer characteristic $\{H_{p,q}\}$ on the (p, q) space, and the result is converted into the SP signal transfer characteristic $\{h_{m,n}: (m, n) \in Z_{TRA}\}$ on the (m, n) space. In other words, for the carrier frequency direction (p direction) on the (p, q) space, IFFT (Inverse Fast Fourier Transform) processing is performed so as to convert the frequency domain into the time domain, and for the symbol time direction (q direction), FFT (Fast Fourier Transform) processing is performed so as to convert the time domain into the frequency domain.

Figure 5:
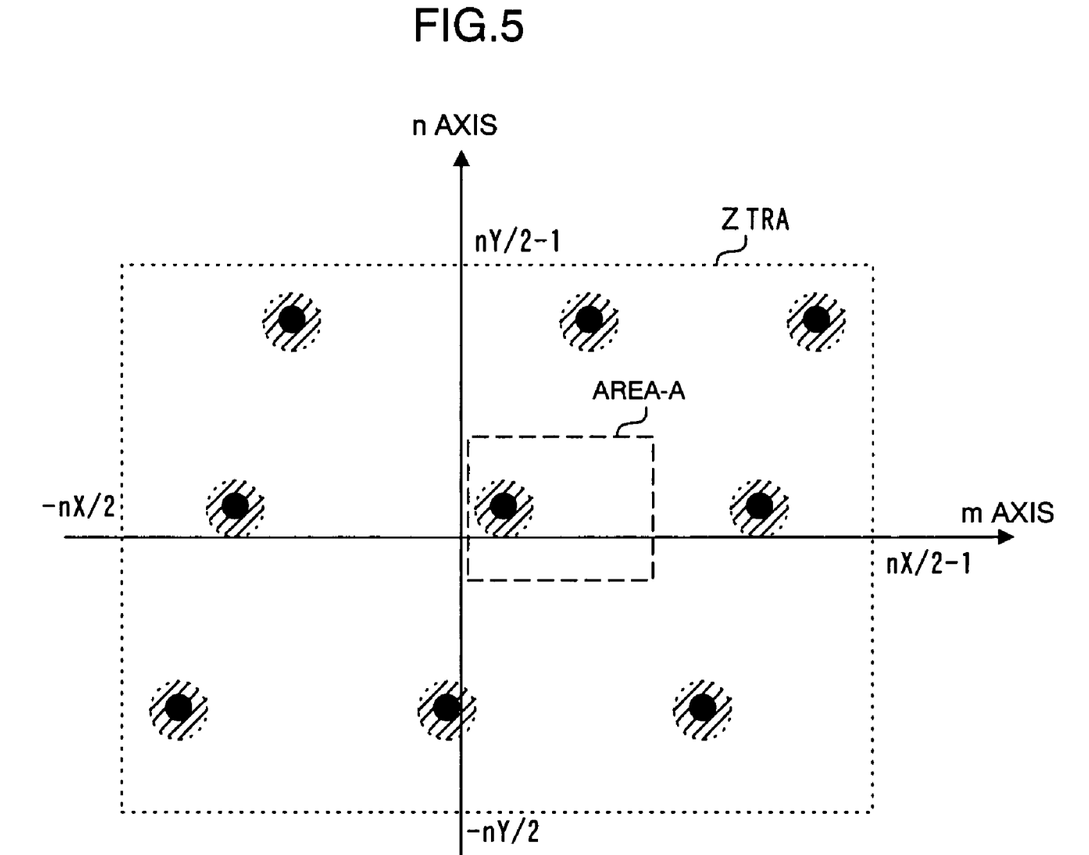
FIG. 5 is a diagram illustrating the distribution of the SP signal transfer characteristic on the (m, n) space after two-dimensional Fourier transform.

By this, in the (m, n) space after the two-dimensional Fourier transform shown in FIG. 5, the m axis direction corresponds to the dimension of time, and the n (axis direction corresponds to the dimension of frequency. And the area $Z_{2D}$ on the (p, q) space corresponds to the area $Z_{TRA}$ transformed on the (m, n) space, and this area is defined as $-nX/2 \leq m < nX/2$ in the m axis direction, and as $-nY/2 \leq n < nY/2$ in the n axis direction.

On the (m, n) space after performing two-dimensional Fourier transform on the (p, q) space, the m axis corresponds to the time and the n axis corresponds to the frequency. Specifically, the m axis corresponds to the delay time of the impulse response of the transmission path, and the n axis corresponds to the fluctuation frequency (Doppler frequency) of the transmission path characteristics. Therefore the power spectrum of the transmission path transfer characteristic, which appears on the (m, n) space, tends to concentrate on a specific area on the (m, n) space according to the radio wave receiving environment.

For example, in the case of stationary reception in a suburban area where no such building as a skyscraper exists around the receiver 1, the spread of the delay of receive radio waves due to multi-paths is small, and scattering in the m axis direction is small. Also the receiver is fixed, so the time-based fluctuation of the transmission path characteristic is small, and scattering in the n axis direction is small. FIG. 5 shows the spectrum distribution of the SP signal transfer characteristic $\{h_{m,n}\}$ on the (m, n) space under this receive environment, and in FIG. 5, the black dots and the shaded portions there around indicate the density of the spectrum distribution. In this case, the spectrum distribution of the transmission path transfer characteristic of the SP signal concentrates on area A near the origin on the (m, n) space in FIG. 5.

The plurality of spectrum distributions spotted outside area A are the aliasing components of the original transmission path transfer characteristic spectrum. In other words, the calculation circuit 52 calculates only the SP signal transfer characteristic, out of the signal transfer characteristics which are supposed to be defined in the entire area of the (p, q) space, and approximates the transfer characteristic for the other areas by zero interpolation, regarding $H_{p,q}=0$. In other words, the SP signal transfer characteristic $\{H_{p,q}\}$, which is the output of the calculation circuit 52, is the transfer characteristic of the receive signal sampled at the superimposed points of the SP signals, and as a result the plurality of aliasing components shown in FIG. 5 are generated on the (m, n) space.

The center-of-gravity calculation circuit 54 calculates the estimated frequency deviation signal based on the spectrum distribution. In other words, the center-of-gravity calculation circuit 54 selects an appropriate target area or area of interest (e.g. area A) which does not include the aliasing components out of the spectrum distribution in FIG. 5, and calculates the center-of-gravity ng in the n axis direction for the SP signal transfer characteristic $\{h_{m,n}\}$ included in this area.

For this center-of-gravity calculation method, various methods can be used.

For example, as the following Equation 1 shows, the center-of-gravity ng may be determined using a square value of each SP signal transfer characteristic existing in area A. In Equation 1, n indicates the distance of each $\{h_{m,n}\}$ positioned in the n axis direction on the (m, n) space.

$$ng = \frac{\sum n \cdot |h_{m,n}|^2}{\sum |h_{m,n}|^2} \quad \text{[for } (m, n) \in \text{target area]} \qquad \text{[Equation 1]}$$

where $$|h_{m,n}|^2 = \text{re}(h_{m,n})^2 + \text{im}(h_{m,n})^2$$

Also the center-of-gravity ng in the n axis direction for the SP signal transfer characteristic $\{h_{m,n}\}$ included in this area may be determined by the following Equation 2.

$$ng = \frac{\sum n \cdot |h_{m,n}|}{\sum |h_{m,n}|} \quad \text{[for } (m, n) \in \text{target area]} \qquad \text{[Equation 2]}$$

where $$|h_{m,n}| = \sqrt{\text{re}(h_{m,n})^2 + \text{im}(h_{m,n})^2}$$

Also the center-of-gravity ng may be determined by the following Equation 3. In Equation 3, re(A) indicates the real number part of the complex number A, and im(A) indicates the imaginary number part of the complex number A.

$$ng = \frac{\sum n \cdot \{|\text{re}(h_{m,n})| + |\text{im}(h_{m,n})|\}}{\sum \{|\text{re}(h_{m,n})| + |\text{im}(h_{m,n})|\}} \qquad \text{[Equation 3]}$$

[for $(m, n) \in$ target area]

The center-of-gravity calculation circuit 54 calculates the center-of-gravity ng in the n axis direction for $\{h_{m,n}\}$ existing on the (m, n) space, and then using this result, the center-of-gravity calculation circuit 54 calculates the estimated frequency deviation Fdelta based on the following Equation 4.

$$Fdelta = (ng/nY) \times Fa \qquad \text{[Equation 4]}$$

In Equation 4, Fa is a symbol transmission frequency in the OFDM signal, which is the reciprocal number of the above mentioned symbol transmission period Ta, in other words, Fa=1/Ta.

The center-of-gravity calculation circuit 54 outputs the calculated value of Fdelta from the frequency deviation detection section 50 to the conversion frequency control section 60 as the estimated frequency deviation signal.

As described above, the OFDM signal receiver according to this embodiment is an OFDM signal receiver comprising a front end section 10 for receiving an OFDM signal including a plurality of carriers in which pilot signals, having a predetermined complex amplitude, are superimposed, and generating a complex base area signal by performing frequency conversion processing and sampling processing on the OFDM signal, a symbol extraction section 20 and an FFT processing section 30 for generating a frequency domain symbol signal from the complex base area signal, a receive data decoding section 40 for demodulating the frequency domain symbol signal and generating receive data, a frequency deviation detection section 50 for detecting the frequency deviation of a carrier included in the OFDM signal based on the frequency domain symbol signal, and a conversion frequency control section 60 for adjusting a conversion frequency in the frequency conversion processing of the front end section 10 based on the detected frequency deviation, wherein the frequency deviation detection section 50 further comprises a symbol storage circuit 51, which corresponds to the symbol storage portion for locating the frequency domain symbol signal in the two-dimensional data area on a two-dimensional space corresponding to the carrier frequency and the symbol time and storing it, an SP signal transfer characteristic calculation circuit 52, which corresponds to the transfer characteristic calculation portion for calculating the transfer characteristic of a pilot signal included in the symbol signal located in the two-dimensional data area, a two-dimensional Fourier transform circuit 53, which corresponds to the two-dimensional Fourier transform portion for performing two-dimensional Fourier transform on the calculated transfer characteristic of the pilot signal and locating the data group after the transform in a two-dimensional Fourier transform data area on a two-dimensional space corresponding to a transmission path delay time and transmission path fluctuation frequency, and a center-of-gravity calculation circuit 54, which corresponds to the center-of-gravity calculation portion for determining a center-of-gravity value of the data group located in the two-dimensional Fourier transform data area and calculating the frequency deviation of the carrier based on the center-of-gravity value.

By the above mentioned configuration, the OFDM signal receiver according to the present embodiment can detect the deviation of the carrier frequency accurately even if a disturbance, such as multi-path interference, is large, and the error rate when the OFDM signal is demodulated can be decreased.

EMBODIMENT 2

The second embodiment of the present invention will be described. Excluding the internal structure of the frequency deviation detection section constituting the OFDM signal, the second embodiment is the same as the first embodiment. Therefore for description on the common portions with the first embodiment, see the block diagram shown in FIG. 1 and the detailed description of the first embodiment.

Figure 6:
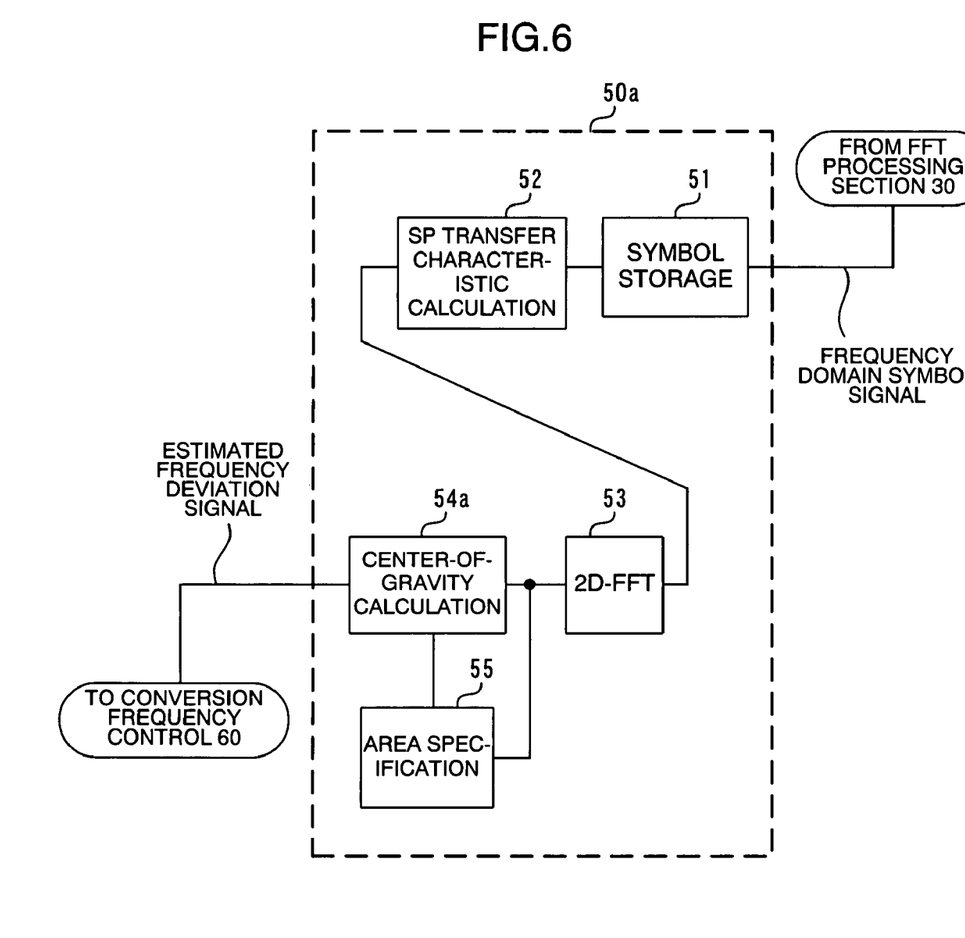
FIG. 6 is a block diagram illustrating the configuration of the frequency deviation detection section 50a according to the second embodiment of the present invention.

Now the configuration and the operation of the frequency deviation detection section 50a, which are different from the first embodiment, will be described with reference to the block diagram in FIG. 6. As FIG. 6 shows, the frequency deviation detection section 50a is comprised of the symbol storage circuit 51, the SP (Scattered Pilot) signal transfer characteristic calculation circuit 52 (hereafter referred to as "calculation circuit 52"), the two-dimensional Fourier transform circuit 53 (hereafter referred to as "transform circuit 53"), a center-of-gravity calculation circuit 54a, and an area specification circuit 55.

Out of each circuit included in the frequency deviation detection section 50a, description on the configuration and the functions is omitted from the symbol storage circuit 51 to the transform circuit 53, which are the same as the first embodiment. In other words, the frequency domain symbol signal, which is output from the FFT processing section 30, is supplied to the center-of-gravity calculation circuit 54a and the area specification circuit 55 via each of the above mentioned circuits, as the data group which indicates the spectrum distribution of the SP signal transfer characteristics $\{h_{m,n}\}$ located on the (m, n) space after the two-dimensional Fourier transform is performed.

Figure 7:
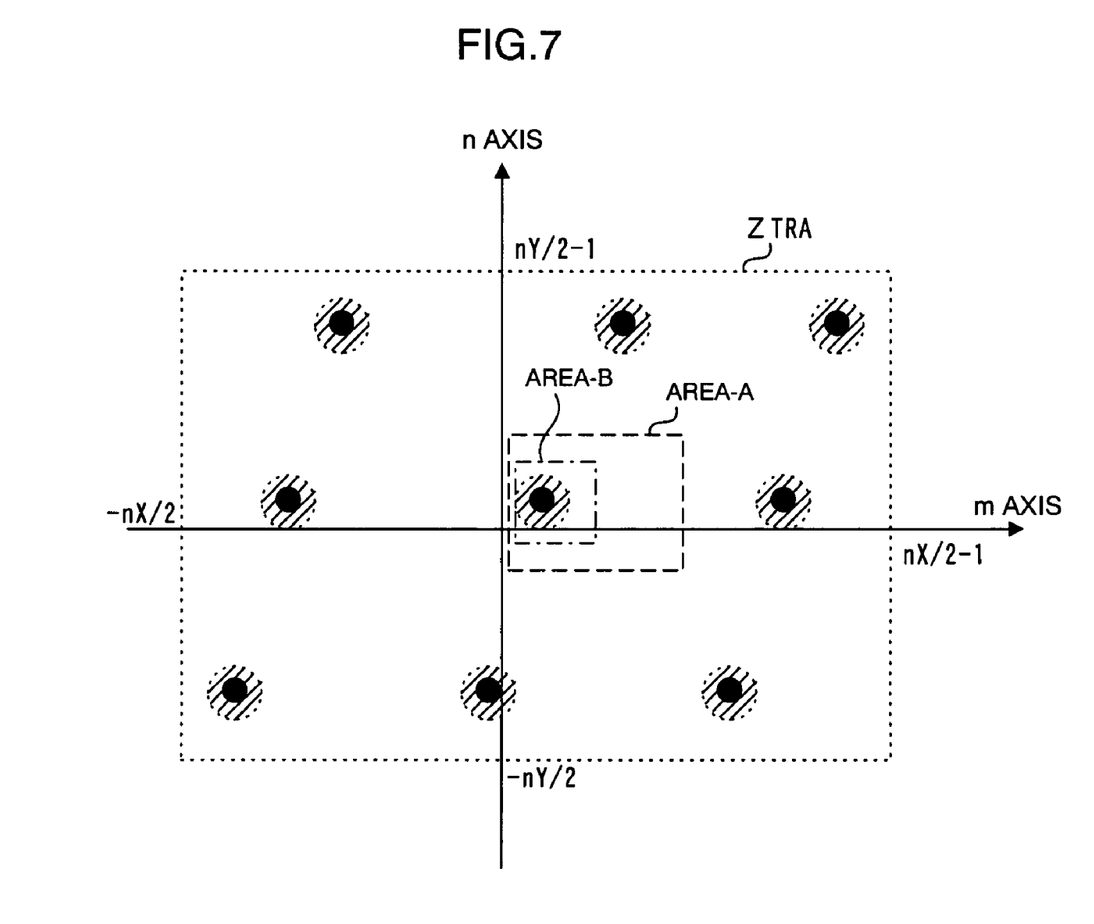
FIG. 7 is a diagram illustrating the center-of-gravity calculation area on the (m, n) space after two-dimensional Fourier transform according to the second embodiment of the present invention.

When the receive environment deteriorates in an urban area due to such buildings as skyscrapers and multi-path waves increase, the spectrum distribution of $\{h_{m,n}\}$ on the (m, n) space may further diffuse. In such a case, only the frequency deviation of the carriers must be detected, out of the many multi-path waves. The area specification circuit 55 is a circuit used as a countermeasure in such a case, and specifies area B of the data group for which the center-of-gravity calculation circuit 54a performs the center-of-gravity calculation as shown in FIG. 7.

For example, data, of which the absolute value of $\{h_{m,n}\}$ existing in area A is greater, is searched, excluding the aliased components, and area B, which is a rectangular area having a predetermined size with these coordinates at the center, is specified as the center-of-gravity calculation area. Based on the specification instruction, the center-of-gravity calculation circuit 54a performs the center-of-gravity calculation using only $\{h_{m,n}\}$ included in area B. Also a predetermined area is selected on the (m, n) space with the coordinates of the maximum absolute value of $\{h_{m,n}\}$ as the center, and the center-of-gravity calculation may be performed using only $\{h_{m,n}\}$ included in this selected space. The center-of-gravity calculation method used by the center-of-gravity calculation circuit 54a is the same as the first embodiment.

As described above, the frequency deviation detection section 50 of the OFDM signal receiver according to the present invention further comprises the area specification circuit 55, which corresponds to the area specification portion for specifying a specific area in the two-dimensional Fourier transform data area, and performs the center-of-gravity calculation only for the data group in the specific area when the center-of-gravity value of the two-dimensional Fourier transform data is determined.

The OFDM signal receiver according to the present embodiment can decrease the number of two-dimensional Fourier transform data to be supplied to the center-of-gravity calculation by using the above configuration, and the calculation steps can be simplified and faster. Because of this, the deviation of the carrier frequency of the OFDM signals can be quickly detected, and the error rate, when the receive data superimposed on the OFDM signal is demodulated, can be further decreased.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2004-334003 which is hereby incorporated by reference.

What is claimed is:

1. An OFDM signal receiver, including:
    a front end section for receiving an OFDM signal including a plurality of carriers in which pilot signals, having a predetermined complex amplitude, are superimposed, and generating a complex base area signal by performing frequency conversion processing and sampling processing on said OFDM signal;
    a symbol extraction section and FFT processing section for generating a frequency domain symbol signal from said complex base area signal;
    a receive data decoding section for demodulating said frequency domain symbol signal to generate receive data;
    a frequency deviation detection section for detecting the frequency deviation of a carrier included in said OFDM signal based on said frequency domain symbol signal; and
    a conversion frequency control section for adjusting a conversion frequency in the frequency conversion processing of said front end section based on said detected frequency deviation, wherein
    said frequency deviation detection section comprises:
    a symbol storage portion for locating and storing said frequency domain symbol signal in a two-dimensional data area on a two-dimensional space corresponding to a carrier frequency and a symbol time;
    a transfer characteristic calculation portion for calculating the transfer characteristic of a pilot signal included in the symbol signal located in said two-dimensional data area;
    a two-dimensional Fourier transform portion for performing two-dimensional Fourier transform on said calculated transfer characteristic of the pilot signal and locating the data group after said transform in a two-dimensional Fourier transform data area on a two-dimensional space corresponding to a transmission path delay time and transmission path fluctuation frequency; and
    a center-of-gravity calculation portion for determining a center-of-gravity value of said data group located in said two-dimensional Fourier transform data area and calculating the frequency deviation of said carrier based on said center-of-gravity value.

2. The OFDM signal receiver according to claim 1, wherein said frequency deviation detection section further comprises an area specification portion for specifying a specific area in said two-dimensional Fourier transform data area, and calculates the center-of-gravity only for the data group in said specific area when the center-of-gravity value of said second Fourier transform data is determined.

3. The OFDM signal receiver according to claim 1, wherein said center-of-gravity calculation portion calculates said center-of-gravity based on a square value of each two-dimensional Fourier transform data located in said two-dimensional Fourier transform data area.

4. The OFDM signal receiver according to claim 1, wherein said center-of-gravity calculation portion calculates said center-of-gravity based on an absolute value of each two-dimensional Fourier transform data located in said two-dimensional Fourier transform data area.

5. The OFDM signal receiver according to claim 3, wherein said center-of-gravity calculation portion calculates said center-of-gravity for a direction of said transmission path fluctuation frequency out of the dimensions in said two-dimensional Fourier transform data area.

6. A method for receiving an OFDM signal, including the steps of:
    receiving an OFDM signal including a plurality of carriers in which pilot signals, having a predetermined complex amplitude, are superimposed, and generating a complex base area signal by performing frequency conversion processing and sampling processing on said OFDM signal;
    generating a frequency domain symbol signal from said complex base area signal;
    demodulating said frequency domain symbol signal and generating receive data;
    detecting the frequency deviation of a carrier included in said OFDM signal based on said frequency domain symbol signal; and
    adjusting a conversion frequency in the frequency conversion processing based on said detected frequency deviation, wherein
    said step of detecting the frequency deviation comprises the steps of:
    locating and storing said frequency domain symbol signal in a two-dimensional data area on a two-dimensional space corresponding to a carrier frequency and a symbol time;
    calculating the transfer characteristic of a pilot signal included in the symbol signal located in said two-dimensional data area;
    performing two-dimensional Fourier transform on said calculated transfer characteristic of the pilot signal and locating the data group after said transform in a two-dimensional Fourier transform data area on a two-dimensional space corresponding to a transmission path delay time and transmission path fluctuation frequency; and
    determining a center-of-gravity value of said data group located in said two-dimensional Fourier transform data area, and calculating the frequency deviation of said carrier based on said center-of-gravity value.

* * * * *